(12) United States Patent
Stevenson et al.

(10) Patent No.: US 8,709,325 B2
(45) Date of Patent: Apr. 29, 2014

(54) LIQUID LOW TEMPERATURE INJECTION MOLDING PROCESS

(75) Inventors: Michael J. Stevenson, Sedona, AZ (US); Robert A. Reeves, Cottonwood, AZ (US)

(73) Assignee: Michael J. Stevenson, Sedona, AZ (US)

( * ) Notice: Subject to any disclaimer, the term of this patent is extended or adjusted under 35 U.S.C. 154(b) by 845 days.

(21) Appl. No.: 11/187,392

(22) Filed: Jul. 21, 2005

(65) Prior Publication Data
US 2007/0017634 A1  Jan. 25, 2007

(51) Int. Cl.
*B29C 45/00* (2006.01)

(52) U.S. Cl.
USPC .................................. 264/328.16

(58) Field of Classification Search
USPC ............... 264/328.16, 334, 328.17, 248, 279, 264/279.1, 310
See application file for complete search history.

(56) References Cited

U.S. PATENT DOCUMENTS

| | | | |
|---|---|---|---|
| 2,628,172 A | 2/1953 | Jenett | |
| 3,189,573 A | 6/1965 | Oken | |
| 4,237,037 A | 12/1980 | Takahasi | |
| 4,260,439 A | 4/1981 | Speer | |
| 4,765,950 A * | 8/1988 | Johnson | 419/2 |
| 4,925,880 A | 5/1990 | Stein | |
| 5,746,961 A * | 5/1998 | Stevenson et al. | 264/255 |
| 6,265,977 B1 * | 7/2001 | Vega et al. | 340/572.7 |
| 6,287,405 B1 | 9/2001 | Stevenson | |
| 6,433,317 B1 * | 8/2002 | Arx et al. | 219/468.1 |
| 6,711,423 B2 * | 3/2004 | Colvin, Jr. | 600/317 |
| 6,852,788 B2 | 2/2005 | Stevenson | |
| 2003/0102600 A1 * | 6/2003 | Stevenson et al. | 264/310 |
| 2006/0224471 A1 * | 10/2006 | Su | 705/28 |

* cited by examiner

*Primary Examiner* — Larry Thrower
(74) *Attorney, Agent, or Firm* — Robert Strauss

(57) ABSTRACT

The molding method of the invention is a low-temperature, liquid-phase, injection molding process using an externally heated mold. This molding process is ideally suited for production of limited quantities of molded parts, as comparatively low cost molds can be used. The molding composition used in the invention is a mixture of a carrier and binder component and a powdered polyethylene component. The carrier and binder component can be a very low density polyethylene, petroleum jelly, hydrocarbon waxes, liquid hydrocarbon oils, or mixtures thereof. The powdered polyethylene component is finely subdivided polyethylene, preferably ultra high molecular weight, having a low melt index, at least no greater than 30. The carrier and binder component is used in sufficient quantity to provide a thixotropic mixture with a consistency of toothpaste, typically having a stirred viscosity up to 30,000 centipoise at the injection temperature of the molding process. Since the process utilizes a mold which is externally heated, it can be controlled to provide minimal heating of the core of the part, thereby permitting one to incorporate components within the part without damage to temperature sensitive elements in the components.

15 Claims, No Drawings

LIQUID LOW TEMPERATURE INJECTION MOLDING PROCESS

BACKGROUND OF THE INVENTION

1. Field of Invention

This invention relates to a low-temperature, liquid phase injection molding process for polyethylene.

2. Brief Statement of the Prior Art

Thermoplastics, particularly polyethylene, are widely used in various molding operations, including rotational molding, blow molding and injection molding. All these processes have some limitations, such as the inability of rotational and blow molding to produce products with reinforced wall areas and the high cost of injection molding equipment which precludes use of this process to produce limited quantities of product.

Some specialized molding processes have been developed for specific resins, such as reaction injection molding wherein an organic polydiisocyanate and a polyol are injected into a mold cavity for reaction therein. Another process is liquid injection molding in which liquid silicon rubber and a catalyst are mixed and metered into a mold cavity. Resin transfer molding is another process which uses a two-part epoxy formulation which is mixed and injected into a mold cavity which is usually loaded with a preformed fiber reinforcement. These specialized processes use thermosetting resins which react and are cured in the mold. Heretofore no process has been developed to permit low-temperature, liquid-phase injection of thermoplastic resins, particularly polyethylene-containing resins, into a mold which is heated to solidify the resin within the mold.

Heretofore there has been no method for the low-temperature liquid phase injection molding of polyethylene, a method which would permit use of low cost molding equipment useful for specialized, low volume manufacture and for molding parts in which temperature sensitive elements such as electronic components are encapsulated.

OBJECTIVES OF THE INVENTION

It is an objective of this invention to provide a polyethylene-containing, molding composition which can be extruded into molds at temperatures below its melting point.

It is a also an objective of this invention to provide a low-temperature, liquid phase injection molding process using the molding composition of this invention.

It is a further objective of this invention to provide a molding process for polyethylene which uses heated molds at low pressure for in-mold melting and solidification of a polyethylene-containing molding composition.

It is likewise an objective of this invention to provide a polyethylene molding process which uses molds of simplified design and less expensive manufacture than used in conventional high temperature and pressure injection molding processes.

It is another objective of the invention to provide a molding process for solid form parts in which temperature sensitive elements can be molded into the core of the molded part.

It is a specific object of this invention to provide a method for encapsulating radio frequency identification circuits in molded polyethylene parts.

Other and related objectives will be apparent from the following description of the invention.

BRIEF DESCRIPTION OF THE INVENTION

The molding composition used in the invention is a mixture of a carrier and binder component and a powdered polyethylene component. The carrier and binder component can be a very low density polyethylene, petroleum jelly, hydrocarbon waxes, liquid hydrocarbon oils, or mixtures thereof. The powdered polyethylene component is finely subdivided polyethylene, preferably ultra high molecular weight, having a low melt index, at least no greater than 30. The molding composition is thixotropic with a consistency of toothpaste, typically having a stirred viscosity up to 30,000 centipoise at the injection temperature of the molding process The molding method of the invention is a low-temperature, liquid-phase, injection molding process using an externally heated mold. As used herein, "low temperature" is defined as a temperature from ambient to an elevated temperature which is below the melting temperature of the powdered polyethylene component and "solid-form" is defined as products prepared by filling a mold cavity with the molding composition, including, as desired, inserts which may also be placed in the molding cavity. This molding process is ideally suited for production of limited quantities of molded parts, as comparatively low cost molds can be used.

Since the process utilizes a mold which is externally heated, it can be controlled to provide minimal heating of the core of the part, thereby permitting one to incorporate components within the part without damage to temperature sensitive elements in the components.

DESCRIPTION OF PREFERRED EMBODIMENTS

The molding process of the invention uses a mixture of a powdered polyethylene component and a carrier and binder component. The selection and the amount of the carrier and binder component used in the molding composition can be varied, depending on the application. Since the carrier and binder component will lessen the physical properties of the powdered polyethylene component, it is desirable to use the least amount of carrier and binder component which is compatible with the intended method of application. For most applications, the carrier and binder component is used in amounts from 40 to 60 weight percent and the polyethylene component is used in amounts from 60 to 40 weight percent.

The powdered polyethylene component can be entirely finely subdivided polyethylene of ultra high molecular weight or can contain up to about 70 weight percent of low to high density polyethylene. A preferred, general purpose blend is from 33 to 67 percent ultra high molecular weight ($10\text{-}35\times10^6$ weight MW) polyethylene and 67 to 33 weight percent low to high density (0.91-0.98 g/cc) polyethylene. In applications where it is important that the molded product have high physical properties, e.g., high strength or toughness, it is preferred to use very high or ultra high molecular weight polyethylene for the entire powdered polyethylene component. The powdered polyethylene component should also have a particle size less than 40 mesh and should have a low melt index, less than 30, preferably less than 20.

The Carrier and Binder Component

The carrier and binder component is a solid or a semi-solid at ambient temperature such as very low density polyethylene, petroleum jelly, hydrocarbon waxes, or mixtures thereof. The carrier and binder component is used in sufficient quantities to provide the mixture with a stirred Brookfield viscosity less than 30,000 centipoise, preferably less than 20,000 centipoise at the injection temperature of the low temperature injection molding process. This viscosity provides the molding composition with the consistency of toothpaste. As used herein, "low temperature" is defined as a temperature below the melting point of the powdered polyethylene component, typically less than about 250° F.; from about 65° F. to 225° F. and preferably from 110° F. to 200° F.

The Carrier and Binder Component

Examples of materials suitable for use as the carrier and binder component in the molding composition include any of the following: very low density polyolefins, petroleumjelly, hydrocarbon waxes, or combinations of these ingredients. The carrier and binder components should be soluble in hydrocarbon solvents or be readily emulsifiable in water for ease of mixing with the powdered polyethylene component.

Very low density polyethylene is the preferred carrier and binder component. Very low density polyethylene (density from 0.85 to 0.90 grams/cubic centimeters) is very suitable as it can accept maximum loading of the selected polymer powder. In some applications, however, petroleum jelly can be used in amounts up to about 50 weight percent of the carrier and binder component to soften the molding composition and render it more pliable for injection.

Hydrocarbon waxes can also be used as the carrier and binder component. Examples of suitable waxes include natural waxes, paraffin wax, synthetic wax, microcrystalline wax, etc. Microcrystalline waxes are refined petroleum waxes that have been crystallized from solvents used to extract wax from highly paraffinic petroleum stocks.

Paraffin wax comprises chiefly n-paraffin hydrocarbons having from 16 to 38 carbons with limited quantities of branched chain paraffins, monocyclic and polycyclic paraffins.

Synthetic hydrocarbon waxes are obtained by the polymerization and copolymerization of hydrocarbon olefins such as ethylene and propylene. Typically these synthetic waxes have molecular weights from 400 to about 3,000 with a narrow molecular weight distribution.

The molding composition is prepared by intimately admixing the polyethylene and carrier components. This can be done by heating the components to an elevated temperature which is below the melting point of the polyethylene component, typically from 125° F. to 225° F., and blending the hot components by mixing at the elevated temperature. Alternatively, the carrier and binder component can be dissolved in a volatile solvent, or emulsified in water using a surfactant as needed to achieve intimate mixing and contacting with the polymer particles. The solvent or water can then be evaporated to obtain a dry mixture of the carrier and binder component which is suitable for injection molding. Solutions and aqueous emulsions with solids contents from 35 to 85 weight percent can be used. Preferably to minimize the amount of solvent or water which must be evaporated, solutions or emulsions are used which have the maximum solids content that are stable and that can be readily mixed.

Other Components

The molding composition can also be formulated with a minor amount (0.5 to 5.0 weight percent) of a hydrocarbon mineral oil to provide the desired consistency at the lowermost injection temperatures, typically from 95° F. to 125° F. Examples of suitable mineral oils include liquid aliphatic hydrocarbon resins, mineral oil, preferably white mineral oil, hydrogenated aromatic resins and terpenes and paraffinic oils.

Examples of suitable aliphatic hydrocarbon resins are C-5 petroleum hydrocarbon resins having Brookfield viscosity at ambient temperature from 15,000 to 45,000 centipoise and molecular weights from 550 to about 900.

Examples of suitable mineral oils are highly refined, low volatility oils which are a blend of saturated aliphatic and alicyclic non-polar hydrocarbons having an average molecular weight from 500 to about 750

Examples of hydrogenated aromatic resins are resins having low molecular weights from about 800 to 1000, and are derived by hydrogenation of petroleum stocks, with softening points from about 15 to 60. Suitable terpene resins are derived from poly-beta-pinene with softening points from 70° to 248° F.

Useful paraffinic oils have 65 to 95 percent saturated hydrocarbons and from 6 to 30 percent aromatic compounds with a distillation range from about 500° to 1000° F.

If desired, a thermal conductor such as copper or aluminum powders or metal coated glass beads can be added in amounts from 3 to 20 weight percent of the molding composition to enhance curing of the molding composition. Cross-linking agents for polyethylene such as organic peroxides can also be added in amounts from 0.1 to 5 weight percent of the polyethylene component to achieve high strength of the molded product.

Various colorants can also be used as the enhancement solid, thereby providing a desired surface appearance. Colorants which are useful include those containing inorganic pigments such as titanium dioxides (rutile, anatase), zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide (lithopones), cadmium mercury mixtures, cadmium sulfide or cadmium sulfoselenides, nickel and titanium dioxide mixtures, sodium, potassium or ammonium coordination compounds of ferri—ferrocyanide, ultramarine blues (a calcined mixture of china clay, sodium carbonate, silica, sulfur and reducing agents), cobalt aluminate (cobalt blues), chromium oxide, metal flake pigments such as aluminum, zinc, copper, bronze powders, metal silver pigments, pearlescent and iridescent flakes of basic lead carbonates, bismuth oxychiorides and titanium coated mica, etc. Various organic pigments which are useful include azo pigments, such as benzimidazolone pigments, pyrazolone pigments, copper phthalocyanine, quinacridones, anthraquinones, condensation pigments, tetra—chioro—isoindolinories, carbon blacks, etc.

In some applications the molding composition can also be loaded with from 1 to 10 weight percent of reinforcement fibers such as chopped fibers of glass, carbon, polyester and nanometer-sized inorganic fillers such as bentonite, silica, etc.

Ultra-violet light stabilizers such as hindered amines can also be included, as desired, in accordance with the supplier's recommendations, typically at concentrations from 0.1 to about 2 weight percent of the molding composition.

Other materials which can be included in the molding composition to form a cellular or foamed product include various chemical or physical foaming agents which are conventionally used in molding resins such as azodicarbonamide and acti-toluenesulfonylsemicarbazide, and other proprietary endothermic and exothermic foaming agents. These foaming agents are used at the supplier's recommended concentrations, usually from 0.25 to about 5 weight percent of the molding composition.

The materials which are used for the semi-solid carrier and binder component and the additives should have a light color to avoid staining the molded product, and should have high heat and ultraviolet light stability.

The molding composition and its use in a low temperature polyethylene injection molding process will be illustrated by the following specific examples.

Example 1

A first molding composition is prepared by blending together 30 weight parts of very low density polyethylene (0.88 g/cc) and 70 weight parts of a polyethylene component formed of 67 parts ultra high molecular weight polyethylene and 33 parts high density polyethylene. The composition has a stirred viscosity of 20,000 centipoise at a temperature of 180° F.

A second molding composition is prepared by blending together 40 weight parts of a high density polyethylene wax and 60 weight parts of a polyethylene component formed of 67 parts ultra high molecular weight polyethylene and 33 parts high density polyethylene. The composition has a consistency of toothpaste at a temperature of 175° F.

Example 2

The first molding composition is used in a low temperature injection molding process. The mold is a two part mold formed of aluminum sheet metal with a thickness of 0.125 inch. The mold is closed and the first molding composition is heated to a temperature of 185° F. and injected into the mold to fill the mold. The injection port is closed and the mold is externally heated to 350° F., held at that temperature for several minutes, then cooled and the mold is opened. A molded polyethylene part is ejected and tested for physical properties. The part is found to have physical properties comparable to parts prepared by conventional high temperature and pressure injection molding.

Example 3

The second molding composition is used in a low temperature injection molding process. The mold is a two part mold formed by carving from blocks of aluminum with a CNC (computer numerical control) machine to form a cavity having an intaglio pattern of a small bracket. The mold is closed and the second molding composition is injected into the mold cavity at 190° F. to fill the mold with the molding composition. When the mold is filled, the mold is heated to a temperature of 365° F. and held at that temperature for approximately three minutes. The mold is then cooled and opened and a molded polyethylene bracket is ejected.

The low temperature injection molding process as used in Examples 2 and 3 permits the fabrication of molded polyethylene parts using relatively inexpensive molds which are fabricated from sheet stock or from solid aluminum stock, thereby providing the capability to mold polyethylene parts in prototype fabrication or for production runs of limited quantities of parts for test marketing or other purposes.

Examples of brackets which can be fabricated are several brackets which are useful as external appendages on kayaks. These are brackets with flat slots for the attachment of belts or straps to the kayak, or brackets with circular loops to receive cords or cables. These can be secured by heat fusion to a preformed kayak, or can be inserted into the rotational mold used to fabricate the kayak where they become fused into the kayak wall during rotational molding of the kayak.

Example 4

The second molding composition is used in another low temperature injection molding process in which a temperature fragile element (RFID chip) is molded into a polyethylene part. The RFID circuit comprises a copper coil surrounding the chip which is encased in a plastic disc formed of a thermosetting resin. The maximum temperature to which the disc can be heated without damage to the microchip of the RFID circuit is 300° F.

The injection apparatus comprises a modified hot glue injection gun having an internal electrical heater which is adjusted to a controlled injection temperature of 195° F. The gun is provided with removable cartridges formed of a metal sleeve with an internal plunger and an extrusion nozzle. The gun also has an air chamber which is pressured and a trigger mechanism to apply air pressure to the plunger of the cartridge to extrude the contents of the cartridge. The apparatus also includes a staging oven having cavities in which cartridges can be stored and preheated to the control injection temperature.

The second molding composition is cast into cardboard cylindrical containers with internal dimensions matching the internal dimensions of the metal sleeves of the injection apparatus. In use, the operator peels the cardboard container from cylindrical cores of the molding composition and inserts the cores of molding composition into metal cartridges of the injection apparatus and places the filled cartridges into the staging oven to preheat the cartridges to the control injection temperature.

It is desired to cast the RFID chip into a small cylindrical plug which can be fused onto a product container or pallet. For this purpose, an inexpensive mold is formed having a base plate and a middle plate which has a thickness approximately 0.566 inch and which has one or more cylindrical holes, approximately one inch diameter to form cylindrical mold cavities. Each of the cavities has a ventport machined into the middle plate. A top plate with an injection port communicating with each of the cylindrical cavities completes the mold assembly.

A RFID disc is placed at the center of each cavity, resting on a 3/32 inch cube of polyethylene. The mold is closed and the molding composition is injected into the mold at a temperature of 190° F. to fill the mold cavities. The mold is then heated externally to a wall temperature of 375° F. and held at that temperature for three minutes, then cooled and opened and molded cylindrical plugs each having a diameter of 1 inch and a thickness of 5/16 inch are recovered. The RFID circuits within the plugs are tested and found to be fully functional.

The molded plugs can be permanently secured to polyethylene containers or pallets by heating the mating surfaces of a plug and container or pallet to the melt temperature of polyethylene, thereby fusing the plug to the container or pallet. In some applications, a plug with an RFID circuit can be placed within the rotational mold for fabrication of a polyethylene part such as a container or pallet and it will permanently fuse into the wall of the part during the rotational molding of the part. In such applications, it may not be necessary to pre-cure the molded plugs, as the plugs will be cured during the rotational molding process.

In a second experiment, bar code labels are applied to the interior wall of the upper mold plate and the low temperature injection molding method of the example is repeated to prepare cylindrical plugs having permanently bonded bar code labels on their surfaces. The plugs can then be permanently bonded to a polyethylene container or pallet following the procedure of the example to obtain a pallet having bar code and RFID information.

The invention has been described with reference to the illustrated and presently preferred embodiment. It is not intended that the invention be unduly limited by this disclosure of the preferred embodiment. Instead, it is intended that the invention be defined by the steps and components, and their obvious equivalents, set forth in the following claims.

What is claimed is:

1. A liquid phase injection molding process for polyethylene resins which comprises:
   a. injecting into a mold a molding composition containing a polyethylene powder component at an injection temperature below the melting temperature of said polyethylene powder component, said molding composition consisting essentially of:
      i) from 40 to 60 weight percent of polyethylene powder component comprising ultra high molecular weight polyethylene; and
      ii) a carrier and binder component selected from the group consisting of: very low density polyethylene, petroleum jelly, hydrocarbon waxes, and mixtures thereof in an amount from 60 to 40 weight percent, sufficient to provide said molding composition with a stirred viscosity less than 30,000 centipoise at said injection temperature;
   b. discontinuing said injection of said molding composition when said mold is filled with said molding composition;
   c. applying heat to the exterior of the mold for sufficient time to melt said polyethylene powder component;
   d. cooling the mold to an ejection temperature from about 75° F. to 145° F. and;
   e. opening the mold and ejecting a molded solid-form polyethylene part.

2. A liquid phase injection molding process to incorporate a temperature fragile element within a molded polyethylene resin part formed in an injection mold, which method comprises:
   a. positioning a solid polyolefin support member against an interior wall of said injection mold and securing the temperature fragile element against said support member at a position spaced apart from the interior walls of said mold;
   b. injecting into a mold a molding composition containing a polyethylene powder component at an injection temperature below the melting temperature of said polyethylene powder component, said molding composition consisting essentially of from 40 to 60 weight percent polyethylene powder component comprising ultra high molecular weight polyethylene, and a carrier and binder component selected from the group consisting of: very low density polyethylene, petroleum jelly, hydrocarbon waxes, and mixtures thereof in an amount sufficient to provide said molding composition with a stirred viscosity less than 30,000 centipoise at said injection temperature;
   c. discontinuing said injection of said molding composition when said mold is filled with said molding composition;
   d. heating the exterior of the mold to a temperature above the melting temperature of the polyethylene powder component for sufficient time to melt said polyethylene powder component;
   e. cooling the mold to an ejection temperature from about 75° F. to 145° F.; and
   f. opening the mold and ejecting a molded polyethylene part containing the heat fragile element.

3. The liquid phase injection molding process of claim 1 or 2 wherein said powder polyethylene component is a blend of 33 to 67 weight percent ultra high molecular weight polyethylene and 67 to 33 weight percent low to high density polyethylene.

4. The liquid phase injection molding process of claim 1 or 2 wherein said carrier and binder component includes from 0.5 to 5 weight percent of a hydrocarbon mineral oil selected from the group consisting of liquid aliphatic hydrocarbon resins, mineral oil, hydrogenated aromatic resins and terpenes, paraffinic oils, and mixtures thereof.

5. The liquid phase injection molding process of claim 1 or 2 wherein said carrier and binder component comprises very low density polyethylene.

6. The liquid phase injection molding process of claim 1 or 2 wherein said carrier and binder component comprises petroleum jelly.

7. The liquid phase injection molding process of claim 1 or 2 wherein said carrier and binder component comprises a hydrocarbon wax.

8. The liquid phase injection molding process of claim 1 or 2 wherein said carrier and binder component includes from 0.5 to 5 weight percent of a liquid aliphatic hydrocarbon resin.

9. The liquid phase injection molding process of claim 1 or 2 wherein said polyethylene powder component also contains 70 weight percent of low to high density polyethylene.

10. The process of claim 2 wherein said heat fragile element comprises an electronic circuit.

11. The process of claim 10 wherein said electronic circuit includes a temperature fragile microchip.

12. The process of claim 11 wherein said electronic circuit is a radio frequency identifying circuit.

13. The process of incorporating a radio frequency identifying circuit with a polyethylene object by placing the molded part prepared by the process of claim 12 against a surface of the polyethylene object and heating the surface and the molded part to the melting temperature of polyethylene for sufficient time to fuse the part into the surface of the polyethylene object.

14. The process of claim 1 wherein said injection temperature is from ambient to an elevated temperature below the melting temperature of the polyethylene powder component.

15. The process of claim 2 wherein said injection temperature is from ambient to an elevated temperature below the melting temperature of the polyethylene powder component.

* * * * *